United States Patent Office 3,652,760
Patented Mar. 28, 1972

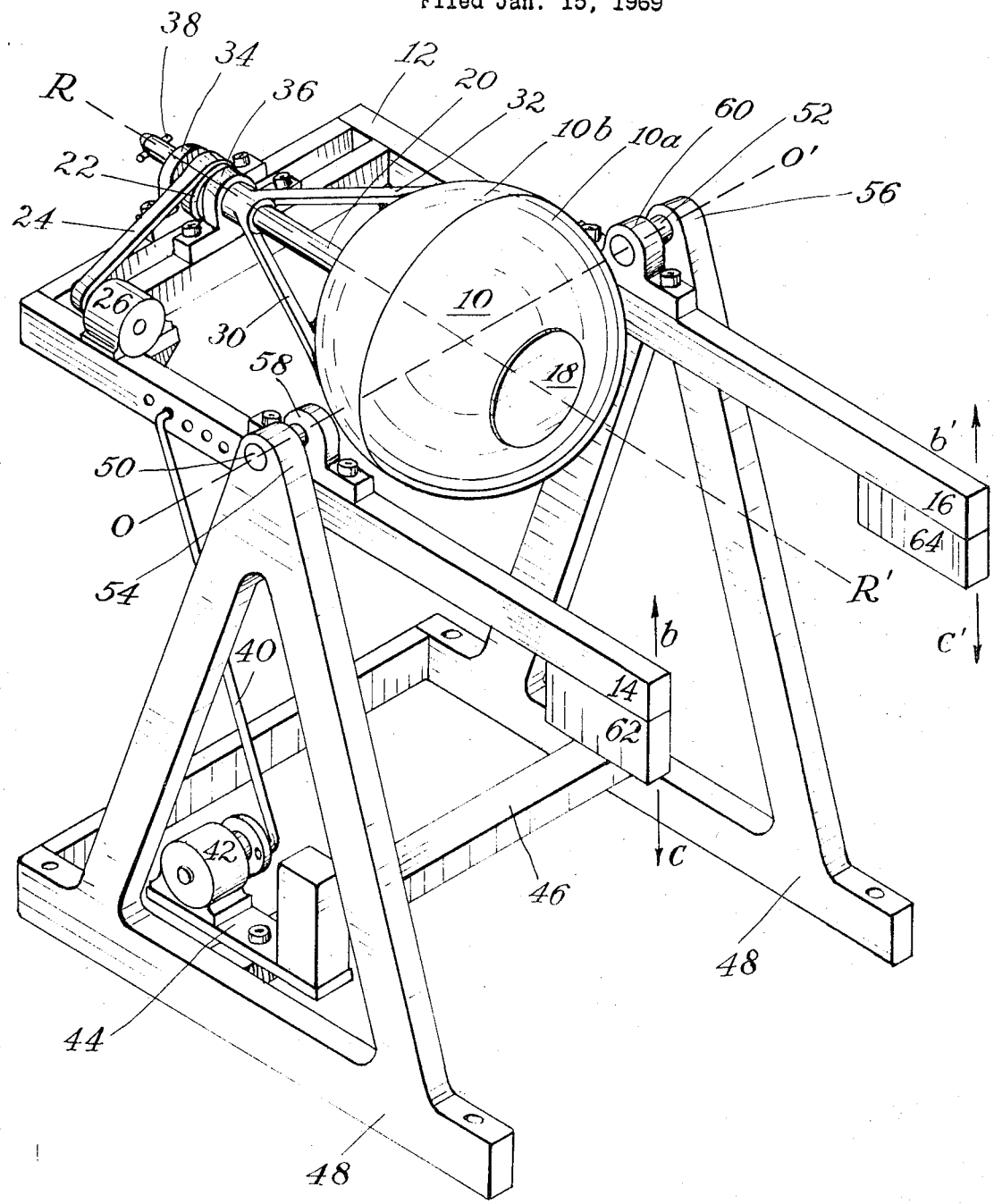

3,652,760
PROCESS FOR CASTING ACRYLIC SPHERES
Jan Petri, Pomfret, Conn., assignor to
Spheres, Inc., Warminster, Pa.
Filed Jan. 15, 1969, Ser. No. 791,251
Int. Cl. B29c 5/04
U.S. Cl. 264—310          4 Claims

ABSTRACT OF THE DISCLOSURE

Method for casting thermoplastic bodies, such as acrylic spheres, involving the rotation about a first axis of a hollow mold containing a liquid charge of the thermoplastic, and the simultaneous oscillation of the mold about a second axis, substantially perpendicular to the first and parallel to the earth's horizontal, for a period of time sufficient to permit the thermoplastic to distribute itself evenly over the mold surface while solidifying, and thereby provide a hollow cast body characterized by a substantially uniform wall thickness and a configuration matching the interior surface of the mold.

BACKGROUND OF THHE INVENTION

Field of the invention

This invention relates to the production of hollow, thermoplastic bodies, particularly seamless, one piece bodies of synthetic thermoplastic polymer materials. The invention finds particular utility in the casting of hollow, acrylic resin bodies, such as spheres, ellipsoids, and other configurations characterized by exterior double curved surfaces.

Description of the prior art

The production of plastic parts of various sizes and shapes by rotational molding techniques is known. [See, e.g., Modern Plastics Encyclopedia, vol. 45/No. 1A, 1968, pp. 825 et seq; Modern Plastics, vol. 45, No. 7, March 1968 pp. 84 et seq.] While the art of rotational molding per se is old, the technological refinements achieved in recent years have revitalized interest in the method which has, accordingly, gained increased commercial importance.

Generally speaking, rotational molding techniques involve the production, within a two part closed mold or cavity, of a product which may be of virtually any size or shape. The raw molding material in the form of a powder is introduced into the mold cavity and the mold halves are locked together. Molding is generally conducted at high temperatures (up to 900° F.) while the part is biaxially rotating. During the molding operation, the heat penetrates the mold walls causing the powdered raw materials to begin to fuse. The material in the mold seeks the lowest point and, since the mold is rotating, the mold surfaces rotate around the bulk of the material and are gradually coated with the material until all of the material is distributed on the mold surfaces. Thereafter, the formed part is cured, either within or outside of the mold.

While prior art methods of rotational molding have achieved some acceptance, they leave much to be desired. For example, while it has been suggested that a liquid (as opposed to a powder) charge may be employed (see Modern Plastics Encyclopedia, supra, p. 826) it has not, to the best of my knowledge, been possible successfully to produce hollow cast parts from liquids (such as acrylic resin polymer-monomer casting syrups) by rotational molding techniques.

OBJECT OF THE INVENTION

It is accordingly a primary object of the invention to provide a method for casting hollow thermoplastic bodies from a liquid charge.

Yet another object of the invention is to provide a method for casting hollow acrylic spheres, characterized by a substantially uniform wall thickness, from a liquid acrylic polymer-monomer syrup.

A further object of the invention is to provide a method for making hollow, seamless, biaxially oriented thermoplastic sphere characterized by a substantially uniform wall thickness.

SUMMARY OF THE INVENTION

The present invention takes advantage of the unexpected discovery that hollow, seamless, thermoplastic bodies may be cast from liquid starting materials by simultaneously rotating and oscillating the mold to which the liquid material has been charged. In accordance with the invention, a predetermined amount of liquid material is charged to a mold which is adapted to rotate about one axis and simultaneously oscillate about a second axis, substantially perpendicular to the first and parallel to the earth's horizontal. As the mold is simultaneously oscillating and rotating, the viscosity of the charge of liquid thermoplastic material in the mold is increased to cause gradual solidification of the charge, and build-up of the wall thickness of the article to be formed, thereby to provide a hollow thermoplastic body of predetermined wall thickness and an external configuration matching the interior surface of the mold.

The speeds at which the mold is rotated and oscillated in accordance with the invention may vary to some extent, depending upon the size of the part to be cast and the nature and viscosity of the particular thermoplastic liquid charged to the mold. It has been found, however, that a speed of rotation below about 5 revolutions-per-minute is most advantageously used. Generally speaking, the speed of rotation is such that the peripheral speed of a point located on the interior mold surface and lying within a plane perpendicular to the axis of rotation and passing through the geometric center of the sphere, is preferably between about 35 and about 40 inches per minute. Though higher speeds may be employed, it has been found that the resulting parts do not exhibit the uniformity generally desired, and are characterized by ribs or streaks on their exterior surfaces. Lower rotational speeds of the order of one, or one-half revolution-per-minute may be advantageously employed when acrylic spheres are to be cast from high viscosity polymer-monomer syrups.

Similarly, the speed of oscillation should be kept fairly low, perferably not exceeding one cycle per minute. Generally, the speed of oscillation should be such that a point on the mold surface and lying on the axis of rotation travels, within one minute, a full cycle distance of from about 12 to about 15 inches. Oscillation at higher speeds has been found to affect the uniformity of the final cast product, and may be undesirable. Speeds of oscillation as low as one oscillation over a ten minute period have been successfully employed where high viscosity acrylic polymer-monomer syrups have been utilized in the mold.

Generally speaking, the invention finds utility in the production of hollow parts from virtually all thermoplastic materials. However, thermoplastic polymer materials such as the molding and casting polymers disclosed at pages 30–46 of Modern Plastics Encyclopedia, vol. 45/No. 1A, 1968 (which pages are herewith incorporated in, and made part of, the present disclosure) are generally preferred.

A class of polymers particularly adapted for the production of hollow bodies in accordance with the invention are the acrylic resins, such as, for example, polymerized methyl methacrylate. Where it is desired to produce cast acrylic parts, the material charged to the mold should generally comprise a high viscosity (from 20,000 to 250,000 centipoises, preferably between 20,000 and 35,000 centipoises, at 86° F.) polymer-monomer syrup characterized by a polymer solids content of about about 20 weight percent.

The temperature at which thermoplastic parts may be cast in accordance with the invention will vary depending upon the particular thermoplastic employed, its initial viscosity, and the desired wall thickness of the part to be cast. Generally, where thermoplastic melts are employed the wall temperature of the mold should be above the solidification temperature of the thermoplastic, and may then be slowly lowered to permit gradual solidification as the main charge of the thermoplastic is distributed over the molding surface during the simultaneous rotating-oscillating motion. Where, as in the case of acrylic resins, polymer-monomer syrups containing a high percentage of polymer dissolved in the monomer are to be employed, the mold wall temperature should be maintained at or near the polymerization temperature of the monomer, so as to permit a gradual gellation and wall build-up of the article being cast. Temperatures at which acrylic parts are cast will therefore vary from 100° to 230° F. Production of cast parts from polymethyl methacrylate is consequently achieved with wall mold temperatures of the order of about 140° F.

Maintenance of the desired mold surface temperature can be achieved through the use of any convenient means, as, for example, by the use of a double-walled mold through whose wall cavity a heat transfer fluid, such as water or steam, may be circulated to maintain the desired temperature. Alternatively, the mold may simply be sprayed with hot water or circulating air at the proper temperature during the rotating-oscillating casting operation. Other methods for maintaining the desired mold surface temperature will readily occur to those skilled in the art.

The time required to cast thermoplastic parts in accordance with the invention will also vary, depending upon the type of material charged to the mold, and the wall thickness of the part ultimately desired. Generally, the simultaneous rotating-oscillating motion is maintained for a period of time sufficient to permit the entire liquid charge to be distributed evenly over the interior surface and to gel or solidify to the point where the cast part may be removed from the mold without effecting its physical integrity. In the case where acrylic spheres, of diameters ranging from about 16 inches upward with wall thicknesses ranging from one-sixteenth inch upwards, are cast, casting times ranging from 60 to 480 minutes have been successfully employed at rotating speeds ranging from 0.5 to 5 revolutions-per-minute and oscillating speeds ranging from 1 minute to 4 minutes for one full oscillation.

While parts cast in accordance with the invention from certain thermoplastic materials may not require any curing or heating after removal from the mold, it is often desirable, as with acrylic resins for example, to effect a post-cure of the cast part after it has been formed. Post-curing may be achieved either within the casting mold or the part may be removed from the mold and cured in suitable heating ovens or chambers. As will be appreciated by those skilled in the art, the post-curing temperature will depend upon the particular thermoplastic used to cast the part. Where acrylic polymers are employed, the post-curing temperature will generally range from 210° to 240° F.

The thermoplastic spheres, ellipsoids or other hollow articles whose exterior surfaces may be described as "double curved surfaces" (i.e. spheres, toruses, prolates, oblates, etc.) which are cast in accordance with the invention are characterized by extremely uniform wall thickness. Accordingly, each such cast article may be expanded as by the application of fluid pressure within the article to provide a larger article of substantially the same shape and characterized by a thinner wall thickness. Such expansion, as by means of air pressure for example, will also serve to biaxially orient the article walls, and thereby improve the physical properties of the expanded article. The hollow, seamless cast thermoplastic articles produced in accordance with the invention may be used in a variety of applications, as, for example, floats, containers, appliance parts and bouys. Acrylic spheres cast in accordance with the invention, because of their light-transmission characteristics, find particular utility as lighting globes. Other uses of the cast articles of the invention will readily occur to those skilled in the art.

DESCRIPTION OF THE DRAWING AND PREFERRED EMBODIMENTS

For further objects and advantages of the invention, and for a more detailed discussion of preferred embodiments thereof, reference is to be had to the following description taken in conjunction with the accompanying drawing which comprises an isometric view of apparatus useful in the practice of one form of the invention.

As shown in the drawing, a hollow, substantially spherical mold 10 is suitably mounted on a supporting frame 12 in a fashion permitting rotation of the mold 10 about a first axis, defined by the imaginary line R-R', henceforth referred to as the axis of rotation. The supporting frame 12 is adapted to oscillate about a second axis, defined by the imaginary line O-O', henceforth referred to as the axis of oscillation. The axis of oscillation intersects, and is parallel to the earth's horizontal (not shown) and is substantially perpendicular to the axis of rotation R-R'.

During use of the apparatus shown in the drawing in the practice of the invention, the mold 10 is rotated about the axis of rotation R-R' and simultaneously is oscillated about the axis of oscillation, O-O', such that during the first half of the period of oscillation the ends 14 and 16 of the frame 12 travel upwardly, in the direction of the arrows b, b'. During the second half of the period of oscillation the ends 14 and 16 travel downwardly, in the direction of the arrows c, c'. At the moment during the oscillation cycle when the axis of rotation R-R' is parallel to the earth's horizontal, the axis of rotation and oscillation lie in a plane parallel to the earth's horizontal.

The mold 10 may be a lightweight, hollow, two part (10a and 10b), spherical mold, as of aluminum for example, including an easy access cover, or door, 18 which covers the opening through which the charge of thermoplastic is added to the mold. The diameter of the opening which is closed by the cover 18 can vary to some extent, but preferably should be of sufficient diameter to allow charging of the mold 10 with the desired amount of thermoplastic material.

Rotation of the mold 10 about the axis R-R' is achieved by means of drive shaft 20 fitted with rotational disc 22 which is driven through a belt or coupling means 24 by a rotational drive varispeed motor 26.

Mold 10 is secured to the drive shaft 20 at their point (not shown) of engagement. Additional support of the mold 10 by the shaft 20 is provided by means of the cantilever reinforcing arms 30, 32, the respective opposite ends of each being secured to the mold 10 and the drive shaft 2.

Drive shaft 20 serves to support the mold 10 on the oscillating frame 12 through bearing blocks 34 and 36 which are secured directly to the end portion of the frame 12. A pin 38 is fitted through the shaft 20 at the end extending away from the mold 10 and through the bearing block 34 to prevent the shaft-mold assembly from slipping out of engagement with the bearing blocks 34 and 36 when the ends 14 and 16 of the oscillating frame 12 reach their lowest point of travel in the direction of the arrows c, c′ during the oscillating cycle.

Oscillation of the frame 12, including the shaft-mold assembly, about the axis O–O′ is achieved by means of drive link 40 driven by a varispeed motor 42 mounted on a platform 44 secured to the lower portion 46 of the A frame assembly 48. The frame 12 is supported from the A frame assembly 48 by the shafts 50 and 52 which pass through the upper portions 54, 56 respectively, of the assembly 48, and into engagement with bearing blocks 58 and 60 which are, in turn, secured to the frame 12. Suitable counterweights 62, 64 are provided at ends 14 and 16, respectively, of frame 12 to permit a balanced distribution of weight around the axis of oscillation O–O′ during the casting operation.

At the commencement of the casting process in accordance with the invention, the two halves 10a and 10b of the mold 10 are secured together and the mold preheated to approximately 140° F. Motion is started at this point such that the mold is simultaneously rotating about axis R–R′ and oscillating about axis O–O′ as described above. A sufficient amount of monomer-polymer acrylic syrup may then be introduced as by brush or by other suitable means to cover the interior of the mold surface to a thickness of the order of 5 to 10 mils. This pre-coating step is by no means necessary, particularly where a higher viscosity syrup (viz 25,000 centipoises and above at 86° F.) is employed in the casting process. However, the pre-coating does serve to seal firmly any cracks as may be present in the mold joint, and provide a "seed bed" for the main syrup charge to grow upon.

The mold is then purged with a stream of inert gas, such as nitrogen, for example, to provide an inert atmosphere in the mold. The main charge of monomer-polymer syrup is then added to the mold while the mold is both rotating and oscillating at the desired rates. The cover 18 is then secured to the mold 10 to seal the open end through which the mold was charged.

The mold is then heated to the polymerization temperature of the acrylic monomer (approximately 140° F.) by any suitable means, as for example by directing a stream of hot water or hot air over the mold.

As the mold rotates and oscillates, the viscous syrup is swept over the interior mold surface, and with each revolution and oscillation a relatively small amount of syrup attaches itself to the underlying layer of partially polymerized gelled mass. Since the layer nearest the mold surface can accept only a certain thickness of the syrup sweeping over it, the gell buildup with each revolution and oscillation has been found to be extremely uniform. Gradually, the main charge of the syrup will have distributed itself uniformly over the entire mold surface, and, depending upon the initial polymer content and catalyst concentration in the charge, will have reached a state of gellation such that the syrup will no longer tend to flow even if motion of the mold is suspended. Generally, it has been found that this state is reached in from one to three hours after the main charge is placed into the rotating and oscillating mold. After this stage has been reached, the mold may be removed from the oscillating frame, and a final heat cure can be effected in another location, as with the aid of a water bath or a curing oven.

When the cast thermoplastic sphere has been fully cured, it is extracted from the mold, any flash as may have been formed at the mold joint is removed, and the cast sphere is ready for further operation as a spherical blank.

Since acrylic polymers are thermoplastics, the spherical blank thus obtained may be heated to forming temperatures of the order of 350° F., and by means of suitable clamping arrangements and the use of air pressure can be blown to provide spheres of larger diameters. The extent to which such thermoplastic spheres may be expanded is limited only by the wall thickness of the blank and the uniformity of its cross section. Such expanding blowing operations will result in the attainment of a sphere of biaxially oriented acrylic polymer. The resulting spheres are characterized by improved physical properties, particularly their toughness and impact resistance, and total resistance to fracture propagation which is recognized as a serious deficiency in cast acrylics.

It should be understood that while the present invention has been described in considerable detail with respect to certain specific embodiments thereof, it is not to be considered limited to those embodiments, but may be used in other ways without departure from the spirit of the invention or the scope of the appended claims.

What is claimed is:

1. The method of casting a hollow sphere from an acrylic polymer-monomer syrup comprising, rotating about a first axis, at a speed not exceeding about five revolutions-per-minute, a mold having an internal molding surface in the form of a sphere, and including a charge of an acrylic polymer-monomer syrup characterized by a viscosity of from 20,000 to 250,000 centipises at 86° F. and of weight sufficient to provide a hollow sphere of predetermined wall thickness, simultaneously oscillating said mold about a second axis disposed substantially perpendicular to the first axis and parallel to the earth's horizontal at a rat not exceeding one cycle per minute to sweep said charge over said internal molding surface, and increasing the viscosity of said syrup as it contacts said internal molding surface during said rotation and simultaneous oscillation to cause polymerization of said monomer and gradual build-up of wall thickness and thereby provide a cast acrylic sphere.

2. The method of claim 1 including the steps of removing the cast sphere from the mold and applying fluid pressure on the interior surface of the cast sphere of a magnitude sufficient to provide a sphere characterized by a greater diameter and a lesser wall thickness than said cast sphere.

3. The method of casting a hollow sphere from an acrylic polymer-monomer syrup comprising, rotating about a first axis a mold having an internal molding surface in the form of a sphere, and including a charge of an acrylic polymer-monomer syrup characterized by a viscosity, at 86° F., of from about 25,000 to about 35,000 centipoises and of weight sufficient to provide a hollow sphere of predetermined wall thickness, simultaneously oscillating said mold about a second axis disposed substantially perpendicular to the first axis and parallel to the earth's horizontal, the speed of rotation being such that the peripheral speed of a point located on the interior mold surface and lying within a plane perpendicular to the axis of rotating and passing through the geometric center of said spherical mold, ranges from about 35 to about 40 inches per minute, the speed of oscillation being such that a point on the spherical mold surface and lying on the axis of rotation travels a full cycle distance of from about 12 to about 15 inches in one minute, and gradually increasing the viscosity of said syrup as it contacts said internal molding surface to cause polymerization of said monomer and gradual build-up of wall thickness and thereby provide a cast acrylic sphere.

4. The method of claim 3 including the steps of removing the cast sphere from the mold and applying fluid pressure on the interior surface of the cast acrylic sphere formed from said acrylic polymer-monomer mixture of a magnitude sufficient to provide a biaxially oriented acrylic sphere characterized by a greater diameter and a lesser wall thickness than said cast acrylic sphere.

References Cited

UNITED STATES PATENTS

| | | | |
|---|---|---|---|
| 1,998,897 | 4/1935 | Kay | 264—310 X |
| 3,337,662 | 8/1967 | Spencer | 264—271 |
| 3,134,140 | 5/1964 | Knowles | 18—26 RR |

FOREIGN PATENTS

| | | | |
|---|---|---|---|
| 1,332,726 | 6/1962 | France | 264—310 |

DONALD J. ARNOLD, Primary Examiner

T. P. PAVELKO, Assistant Examiner